United States Patent
Dickson et al.

(10) Patent No.: US 10,737,699 B2
(45) Date of Patent: Aug. 11, 2020

(54) BRAKING AND/OR ELECTRIC MOTOR CONTROL DURING SHIFTING EVENTS

(71) Applicant: CUMMINS INC., Columbus, IN (US)

(72) Inventors: Jonathan A. Dickson, Columbus, IN (US); Jennifer K. Light-Holets, Greenwood, IN (US); Raymond C. Shute, Columbus, IN (US); Matthew D. Flessner, Westport, IN (US)

(73) Assignee: Cummins Inc., Columbus, IN (US)

( * ) Notice: Subject to any disclaimer, the term of this patent is extended or adjusted under 35 U.S.C. 154(b) by 127 days.

(21) Appl. No.: 15/567,410

(22) PCT Filed: Apr. 21, 2016

(86) PCT No.: PCT/US2016/028639
§ 371 (c)(1),
(2) Date: Oct. 18, 2017

(87) PCT Pub. No.: WO2016/172337
PCT Pub. Date: Oct. 27, 2016

(65) Prior Publication Data
US 2018/0105179 A1    Apr. 19, 2018

Related U.S. Application Data

(60) Provisional application No. 62/150,631, filed on Apr. 21, 2015.

(51) Int. Cl.
*B60W 30/19* (2012.01)
*B60W 10/198* (2012.01)
(Continued)

(52) U.S. Cl.
CPC ............ *B60W 30/19* (2013.01); *B60W 10/06* (2013.01); *B60W 10/08* (2013.01); *B60W 10/11* (2013.01);
(Continued)

(58) Field of Classification Search
CPC .... B60W 10/06; B60W 10/08; B60W 10/198; B60W 10/11; B60W 30/18127;
(Continued)

(56) References Cited

U.S. PATENT DOCUMENTS

| 5,393,276 A | 2/1995 | White et al. |
| 5,638,271 A | 6/1997 | White et al. |

(Continued)

OTHER PUBLICATIONS

International Search Report and Written Opinion dated Jul. 15, 2016 in PCT/US2016/028639.
(Continued)

*Primary Examiner* — Erin D Bishop
(74) *Attorney, Agent, or Firm* — Faegre Drinker Biddle & Reath LLP

(57) ABSTRACT

A system and method are disclosed for controlling shifting of a vehicle having an automated manual transmission. In the system and method, an amount of fuel being provided to a first grouping of cylinders is reduced, where the first grouping of cylinders are fewer than all of the available cylinders; the first grouping of cylinders are placed in an engine braking mode; a first gear of the vehicle transmission is disengaged; an amount of fuel being provided to a second grouping of cylinders which does not include the first grouping of cylinders is reduced; engine speed is reduced by braking; and a second gear of the transmission is engaged.

12 Claims, 4 Drawing Sheets

(51) Int. Cl.
  *B60W 20/15* (2016.01)
  *B60W 10/11* (2012.01)
  *B60W 10/06* (2006.01)
  *B60W 10/08* (2006.01)
  *B60W 30/18* (2012.01)
  *F02D 41/00* (2006.01)
  *F02D 41/02* (2006.01)
  *F02D 17/02* (2006.01)

(52) U.S. Cl.
  CPC .......... *B60W 10/198* (2013.01); *B60W 20/15* (2016.01); *B60W 30/18127* (2013.01); *B60W 30/18136* (2013.01); *F02D 17/02* (2013.01); *F02D 41/0082* (2013.01); *F02D 41/023* (2013.01); *B60Y 2400/71* (2013.01); *F02D 41/0087* (2013.01); *Y02T 10/6286* (2013.01)

(58) Field of Classification Search
  CPC ........... B60W 30/18136; B60W 30/19; B60W 20/14; B60W 20/15; F02D 17/02; F02D 17/023; F02D 17/026; F02D 41/0087; F02D 41/0082; F02D 41/023; F02D 9/06
  See application file for complete search history.

(56) References Cited

U.S. PATENT DOCUMENTS

| | | | |
|---|---|---|---|
| 6,019,698 A | | 2/2000 | Lawrie et al. |
| 6,503,171 B1 | * | 1/2003 | Bockmann .............. F01L 13/06 477/107 |
| 2008/0064567 A1 | | 3/2008 | Kue et al. |
| 2014/0171260 A1 | | 6/2014 | Dalum |
| 2015/0066318 A1 | | 3/2015 | Park et al. |

OTHER PUBLICATIONS

International Preliminary Report on Patentability dated Oct. 24, 2017 in PCT/US2016/028639.

* cited by examiner

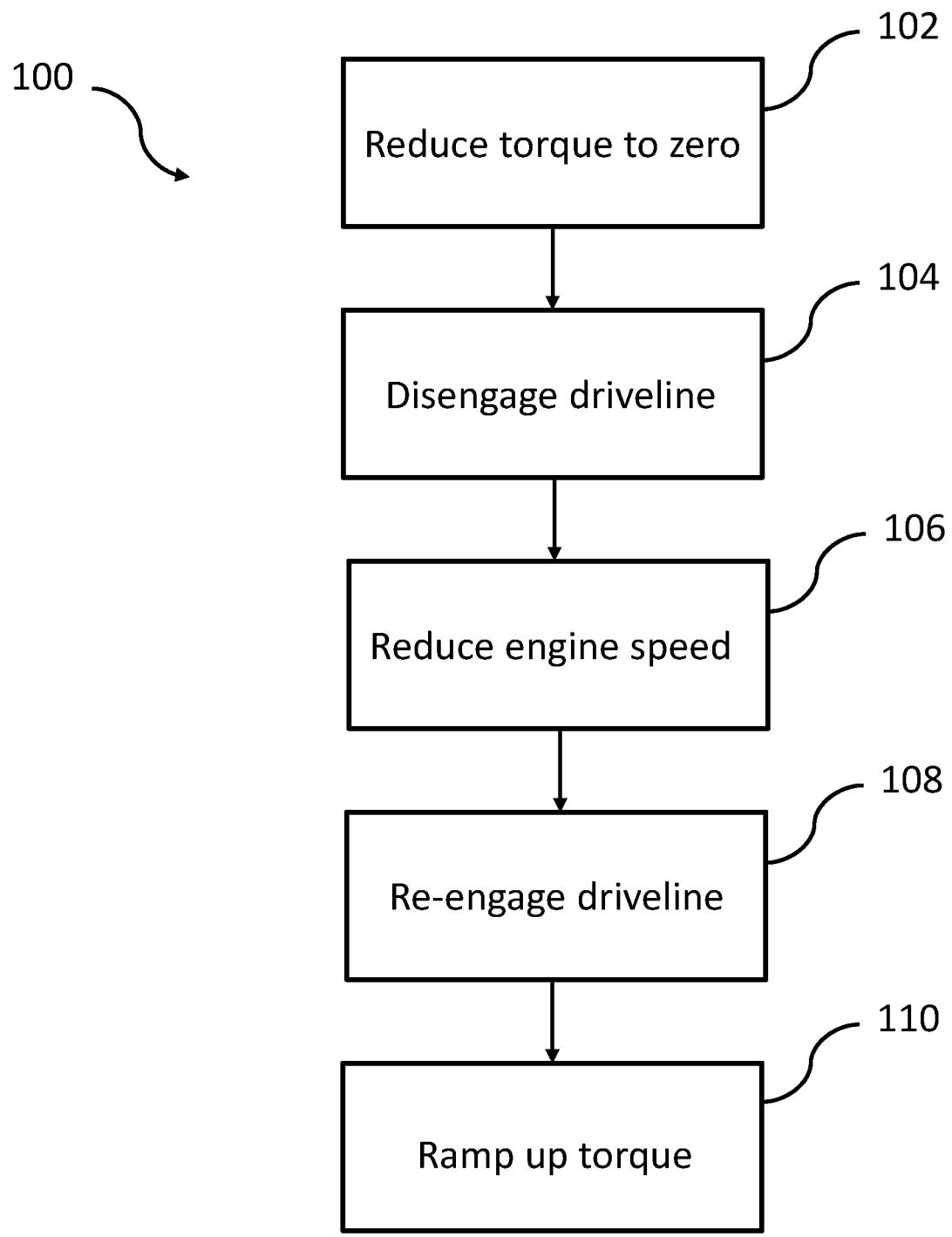
FIGURE 1 – Prior Art

BRAKING AND/OR ELECTRIC MOTOR CONTROL DURING SHIFTING EVENTS

RELATED APPLICATIONS

The present application is a national phase filing under 35 U.S.C. § 371 of International Application No. PCT/US16/28639, titled "BRAKING AND/OR ELECTRIC MOTOR CONTROL DURING SHIFTING EVENTS." filed on Apr. 21, 2016, which claims priority to U.S. Provisional Application Ser. No. 62/150,631, filed Apr. 21, 2015, entitled "BRAKING AND/OR ELECTRIC MOTOR CONTROL DURING SHIFTING EVENTS," the entire disclosures of which being expressly incorporated herein by reference.

FIELD OF THE DISCLOSURE

The present disclosure generally relates to vehicle shifting control, and more specifically to use of engine brakes, regenerative braking and/or an electric motor/generator to assist shifting of vehicles having manual and automated manual transmissions.

BACKGROUND OF THE DISCLOSURE

In many commercial vehicles equipped with an Automated Manual Transmission (AMT), gear shifts can be a challenging transient. In an AMT, the execution of an upshift (shift to the next higher gear, resulting in a net decrease in engine speed) or a downshift (shift to the next lower gear, resulting in a net increase in engine speed) is often paced by the transient response of the engine. While significant increases in fuel may be provided to quickly accelerate the engine to a higher speed needed for a downshift, in an upshift the engine fuel can only be reduced to zero, and deceleration is dictated by engine friction. This deceleration rate can often cause shift times to be in excess of one second. When the driver is attempting to accelerate the vehicle hard, a one second interruption in engine torque can feel very significant. Moreover, attempts to improve engine efficiency often involve reductions in engine friction, which results in even longer deceleration rates.

Accordingly, it is desirable to provide reduced deceleration times during upshifting. It is further desirable to control torque ramp up to improve shift quality, and enhance engine acceleration during downshifting.

SUMMARY

In one embodiment, the present disclosure provides a method for controlling upshifting of a vehicle having an automated manual transmission, comprising: reducing an amount of fuel being provided to a first grouping of cylinders, the first grouping of cylinders being fewer than all of the available cylinders; placing the first grouping of cylinders in an engine braking mode; disengaging a first gear of the vehicle transmission; reducing an amount of fuel being provided to a second grouping of cylinders which does not include the first grouping of cylinders; causing braking to reduce engine speed; and engaging a second gear of the transmission. One aspect of this embodiment further comprises removing the first grouping of cylinders from engine braking mode prior to engaging the second gear. A variant of this aspect further comprises determining when to remove the first grouping of cylinders from engine braking mode in response to a rate of engine speed reduction. In another aspect, causing braking comprises activating a motor/generator of the vehicle to provide regenerative braking. In still another aspect, the braking is compression braking. Another aspect of this embodiment further comprises detecting a beginning of an upshift process. In a variant of this aspect, detecting a beginning of an upshift process comprises detecting at least one of a pedal position, an engine speed, and a torque characteristic. In another aspect of this embodiment, reducing an amount of fuel being provided to a first grouping of cylinders comprises providing fuel to the second grouping of cylinders and activating an electric motor to compensate for a loss of power resulting from the reduced amount of fuel provided to the first grouping of cylinders. In another variant of this embodiment, removing the first grouping of cylinders from the engine braking mode is performed in response to engine speed reaching a first speed threshold and engaging the second gear is performed in response to engine speed reaching a second speed threshold. Another aspect further comprises ramping up engine torque after engaging the second gear by supplying fuel to the first grouping of cylinders and the second grouping of cylinders.

In another embodiment, the present disclosure provides a system for controlling upshifting of a vehicle having an automated manual transmission, comprising: an ECM; a first grouping of fuel injectors configured to provide fuel to a corresponding first grouping of cylinders, the first grouping of cylinders being less that all of the available cylinders; a second grouping of fuel injectors configured to provide fuel to a corresponding second grouping of cylinders which does not include the first grouping of cylinders; and a motor/generator; wherein the ECM is configured to cause the first grouping of fuel injectors to reduce an amount of fuel being provided to the first grouping of cylinders, place the first grouping of cylinders in an engine braking mode, disengage a first gear of the vehicle transmission, cause the second grouping of fuel injectors to reduce an amount of fuel being provided to the second grouping of cylinders, activate the motor/generator to reduce engine speed through braking, and engage a second gear of the vehicle transmission. According to one aspect of this embodiment, the ECM is further configured to remove the first grouping of cylinders from engine braking mode prior to engaging the second gear. In another aspect, the ECM is further configured to determine when to remove the first grouping of cylinders from engine braking mode in response to a rate of engine speed reduction. In still another aspect, the braking is compression braking. In another aspect, the ECM is further configured to detect a beginning of an upshift process. In a variant of this aspect, the ECM is configured to detect a beginning of an upshift process by detecting at least one of a pedal position, an engine speed, and a torque characteristic. In still another aspect, the ECM is configured to cause the first grouping of fuel injectors to ramp up engine torque after engaging the second gear by supplying fuel to the first grouping of cylinders and the second grouping of cylinders.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein:

FIG. 1 is a flowchart of a prior art method of controlling shifting;

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Referring initially to FIG. 1, an overview of a prior art method of executing an upshift on a vehicle with AMT is shown. The steps of method 100 generally mimic the actions of a driver executing a similar upshift using a manual transmission. As shown, in step 102 torque is reduced to zero. Generally, this step is performed to either unload the driveline to allow the transmission to disengage without the aid of a slipping clutch, or to avoid the jarring sensation of a torque discontinuity as the driveline is disengaged with or without a slipping clutch. At the end of step 102, the engine will be performing no work, and engine fueling is consequently equal to only that fueling required to overcome the engine's own internal friction. This level of fueling is relatively low in comparison to the engine's fueling range.

At step 104, the driveline is actually disengaged. If engine fueling (and torque) has been ramped down to the correct value during step 102, then disengaging the vehicle driveline from the engine at step 104 will have minimal impact on engine speed.

Next, at step 106, the engine speed is reduced to a value consistent with current vehicle speed and the desired next gear. For many vehicles, this will require anywhere from a 15% to a 30% drop in engine rpm. As engine fueling has already been significantly reduced at step 102 to facilitate driveline disengagement at step 104, there is very little the engine controller can do to affect a more rapid deceleration. Fueling can only be dropped to zero, at which point engine friction plus accessory loads are all that contribute decelerating forces. Accordingly, step 106 is often the pacing factor in resulting shift times.

Next, at step 108, when engine speed has reached the new target, the driveline is re-engaged. Finally, at step 110, torque is ramped up to the level determined by the driver.

As is known to those skilled in the art, method 100 of FIG. 1 involves a compromise of swiftness and smoothness. There are things that could be done to speed up the process, but those changes may make the upshift feel harsh to the driver. Alternately, there are things that could be done to make the upshift feel smoother to the driver, but those changes may result in an excessive overall shift time. The two steps that are most relevant to this trade-off are step 106 and step 110. Step 106 is relevant because of the difficulty in enhancing the deceleration rate of the engine. Step 110 is relevant because the smooth recovery of the driver's commanded torque is the phase that the driver is most likely to feel. The present disclosure addresses both of these issues for hybrid vehicles.

During step 106, the desire is to reduce engine speed and, thus, engine kinetic energy in preparation for re-engaging the driveline at step 108. Engine braking may be used to reduce engine speed. In one embodiment of the disclosure, the cylinders of the engine are operated in at least two groups.

Figure 2A:
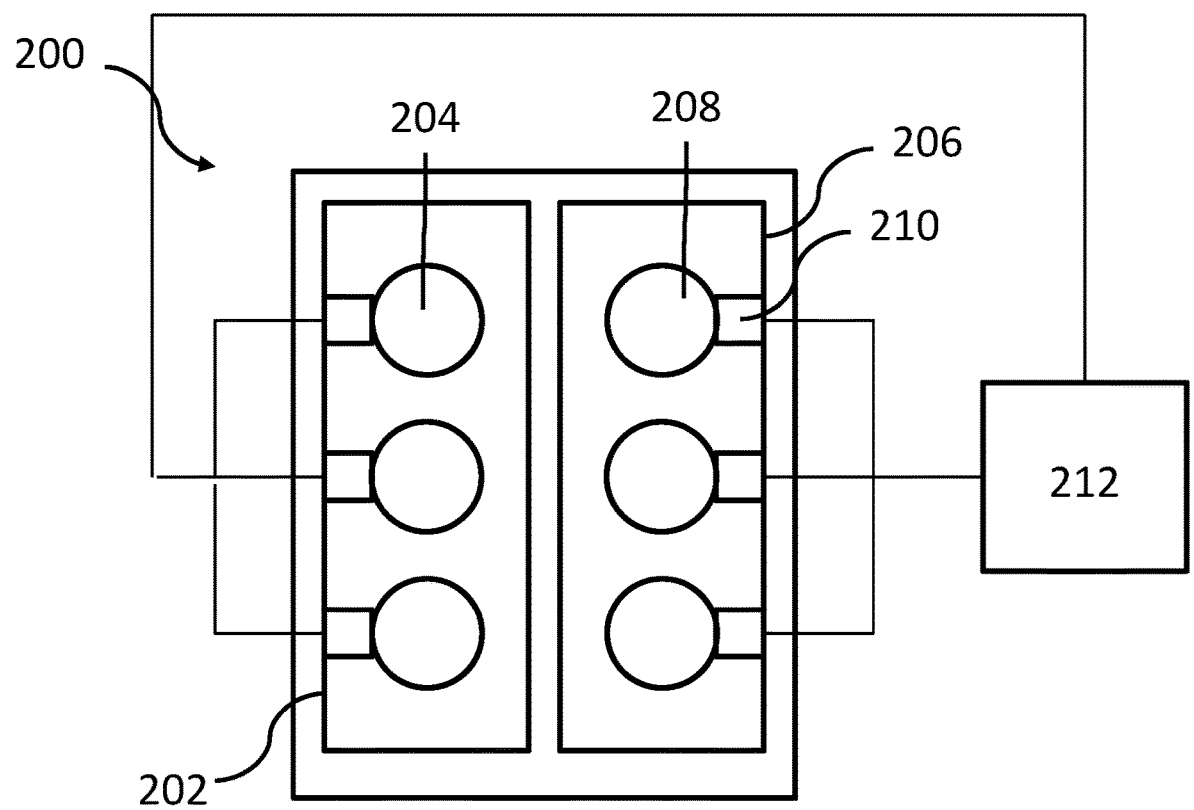
FIGS. 2A-B are block diagrams of portions of an engine coupled to an engine control module.

Referring now to FIG. 2A, engine 200 includes, in this example, a first grouping 202 of cylinders 204 and a second grouping 206 of cylinders 208. It should be understood that more or fewer groupings of cylinders may be used, and that the number of cylinders in each grouping need not be the same. Each cylinder in each grouping is provided fuel by a fuel injector 210 under the control of an engine control module ("ECM") 212.

Figure 2B:
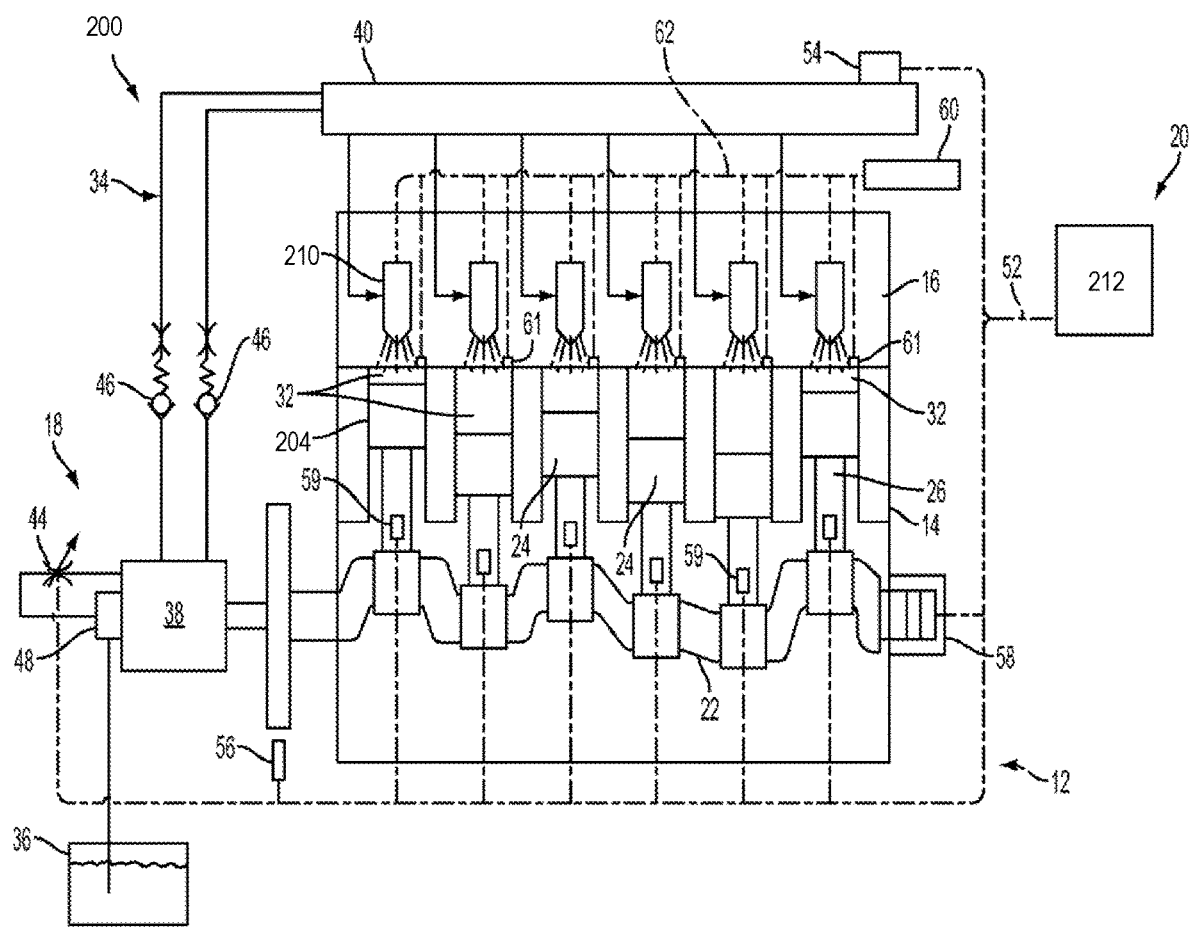

FIG. 2B depicts engine 200 in more detail. As shown, engine 200 generally includes an engine body 12, which includes an engine block 14 and a cylinder head 16 attached to engine block 14, a fuel system 18, and a control system 20 including ECM 212. Control system 20 receives signals from sensors located on engine 200 and transmits control signals to devices located on engine 200 to control the function of those devices, such as one or more fuel injectors 210 as described below.

Engine body 12 includes a crank shaft 22, a plurality of pistons 24, and a plurality of connecting rods 26. Pistons 24 are positioned for reciprocal movement in a plurality of corresponding engine cylinders 204 (cylinders 208 are not shown), with one piston positioned in each engine cylinder 204. One connecting rod 26 connects each piston 24 to crank shaft 22. As will be understood by those skilled in the art, the movement of pistons 24 under the action of a combustion process in engine 200 causes connecting rods 26 to move crankshaft 22.

A plurality of fuel injectors 210 are positioned within cylinder head 16. Each fuel injector 30 is fluidly connected to a combustion chamber 32, each of which is formed by one piston 24, cylinder head 16, and the portion of engine cylinder 204 that extends between a respective piston 24 and cylinder head 16. Fuel system 18 provides fuel to injectors 210, which is then injected into combustion chambers 32 by the action of fuel injectors 30, forming one or more fuel injection events. Such fuel injection events may be defined as the interval of time that begins with the movement of a nozzle or needle valve element (not shown) of the fuel injector 210, permitting fuel to flow from fuel injector 210 into an associated combustion chamber 32, until the nozzle or needle valve element blocks the flow of fuel from fuel injector 210 into combustion chamber 32.

Fuel system 18 includes a fuel circuit 34, a fuel tank 36, which contains fuel, a high-pressure fuel pump 38 positioned along fuel circuit 34 downstream from fuel tank 36, and a fuel accumulator or rail 40 positioned along fuel circuit 34 downstream from high-pressure fuel pump 38. While fuel accumulator or rail 40 is shown as a single unit or element, accumulator 40 may be distributed over a plurality of elements that transmit or receive high-pressure fuel, such as fuel injector(s) 210, high-pressure fuel pump 38, and any lines, passages, tubes, hoses and the like that connect high-pressure fuel to the plurality of elements. Fuel system 18 may further include an inlet metering valve 44 positioned along fuel circuit 34 upstream of high-pressure fuel pump 38 and one or more outlet check valves 46 positioned along fuel circuit 34 downstream of high-pressure fuel pump 38 to permit one-way fuel flow from high-pressure fuel pump 38 to fuel accumulator 40. Though not shown, additional elements may be positioned along fuel circuit 34. For example, inlet check valves may be positioned downstream of inlet metering valve 44 and upstream of high-pressure fuel pump 38, or inlet check valves may be incorporated in high-pressure fuel pump 38. Inlet metering valve 44 has the ability to vary or shut off fuel flow to high-pressure fuel pump 38, which thus shuts off fuel flow to fuel accumulator 40. Fuel circuit 34 connects fuel accumulator 40 to fuel injectors 210, which receive fuel from fuel accumulator 40 and then provide controlled amounts of fuel to combustion chambers 32. Fuel system 18 may also include a low-pressure fuel pump 48 positioned along fuel circuit 34 between fuel tank 36 and high-pressure fuel pump 38. Low-pressure fuel pump 48 increases the fuel pressure to a first pressure level prior to fuel flowing into high-pressure fuel pump 38.

Control system 20 may include ECM 212, a wire harness 52, an interface module 60, and an interface module wire harness 62. Control system 20 may also include an accumulator pressure sensor 54, a cylinder pressure sensor that measures, either directly or indirectly, cylinder pressure, and a crank angle sensor (described below). While sensor 54 is described as being a pressure sensor, sensor 54 may represent other devices that may be calibrated to provide a pressure signal that represents fuel pressure, such as a force transducer, a strain gauge, or other device. The cylinder pressure sensor may be a sensor such as a strain gauge sensor 59 positioned in a location to measure the force generated in combustion chamber 32. For example, strain gauge sensor 59 may be positioned along connecting rod 26, as shown in the exemplary embodiment of FIG. 2B, and thus strain gauge sensor 59 indirectly measures the pressure in combustion chamber 32. A cylinder pressure sensor 61 may be positioned to directly measure pressure in combustion chamber 32. The crank angle sensor may be a toothed wheel sensor 56, a rotary Hall sensor 58, or other type of device capable of measuring the rotational angle of crankshaft 22. Control system 20 uses signals received from accumulator pressure sensor 54 and the crank angle sensor to determine the combustion chamber receiving fuel.

ECM 212 may monitor conditions of engine 200 or an associated vehicle powered by engine 200 and control one or more subsystems of engine 200, such as fuel system 18. In certain embodiments, ECM 212 forms a portion of a processing subsystem including one or more computing devices having memory, processing, and communication hardware. ECM 212 may be a single device or a distributed device, and the functions of ECM 212 may be performed by hardware and/or as computer instructions on a non-transient computer readable storage medium. ECM 212 may include digital and/or analog circuitry. ECM 212 may connect to certain components of engine 200 by wire harness 52, though such connection may be by other means, including a wireless system. For example, ECM 212 may connect to and provide control signals to inlet metering valve 44 and to interface module 60. Interface module 60 connects to fuel injectors 210 by way of interface module wire harness 62.

When engine 200 is operating, combustion in combustion chambers 32 causes the movement of pistons 24. The movement of pistons 24 causes movement of connecting rods 26, which are drivingly connected to crankshaft 22, and movement of connecting rods 26 causes rotary movement of crankshaft 22. The angle of rotation of crankshaft 22 is monitored by ECM 212 to aid in timing of combustion events in engine 200 and for other purposes. The angle of rotation of crankshaft 22 may be measured in a plurality of locations, including a main crank pulley (not shown), an engine flywheel (not shown), an engine camshaft (not shown), or on the camshaft itself. Measurement of crankshaft 22 rotation angle may be made with toothed wheel sensor 56, rotary Hall sensor 58, and by other techniques. A signal representing the angle of rotation of crankshaft 22, also called the crank angle, is transmitted from toothed wheel sensor 56, rotary hall sensor 58, or other device to ECM 212.

Fuel pressure sensor 54 is coupled to fuel accumulator 40 and is capable of detecting or measuring the fuel pressure in fuel accumulator 40. Fuel pressure sensor 54 transmits or sends signals indicative of the fuel pressure in fuel accumulator 40 to ECM 212. Fuel accumulator 40 is connected to each fuel injector 210. Control system 20 provides control signals to fuel injectors 210 that determine operating parameters for each fuel injector 210, such as the length of time fuel injectors 210 operate and the rate of fuel injected during a fuel injection event, which determines the amount of fuel delivered by each fuel injector 210.

Figure 3:
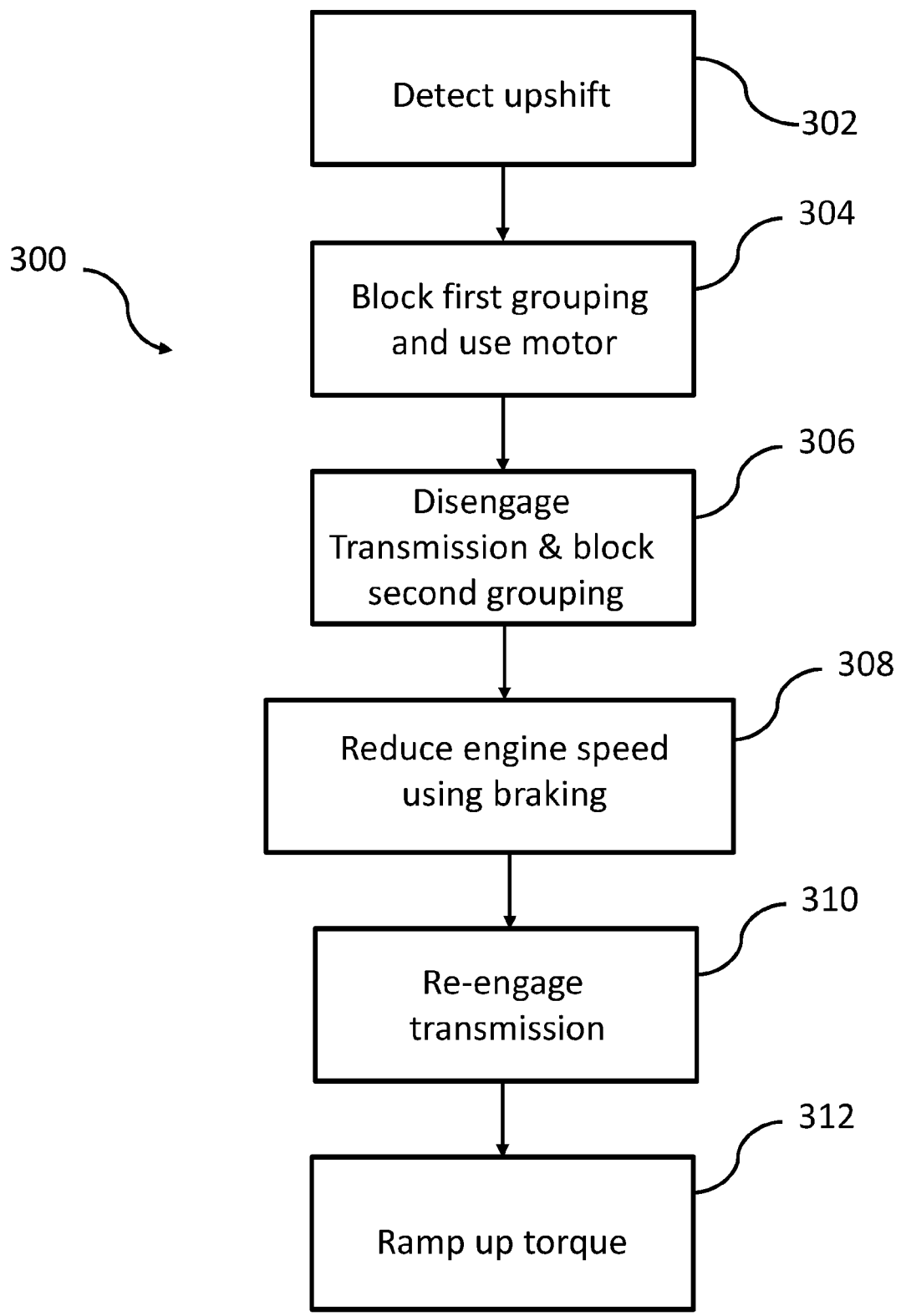
FIG. 3 is a flowchart of a method of controlling shifting according to one embodiment of the present disclosure.

Depending upon the engine application, the engine braking used to reduce the engine speed may be compression braking or any other suitable engine braking technique. A process 300 for controlling an upshift event is depicted in FIG. 3. As shown, the first step 302 is to detect the beginning of an upshift process. This may be accomplished in a variety of ways such as by detecting pedal positions, engine speeds, torque characteristics, etc. At step 304, fuel is blocked to first grouping 202 of cylinders and those cylinders are placed into an engine braking mode via engine braking hardware. Also during step 304, fuel is provided to the second grouping 206 of cylinders and an electric motor is used to compensate for the loss of power resulting from the first grouping 202 of cylinders.

At step 306, a gear of the transmission is disengaged while fuel is blocked (or reduced) from being supplied to the cylinders of the second grouping 206 to produce a reduction in engine speed to permit upshifting. It should be understood that in one embodiment of the disclosure, braking may also be used as indicated by step 308 to reduce the amount of time needed for engine speed reduction to a speed that permits upshifting. In one embodiment, when braking is used at step 308, the first cylinder grouping 202 may be taken out of engine braking mode prior to the gear engagement at step 310. The time at which this occurs may be determined based on the rate at which the engine speed is approaching the reduced speed necessary to permit upshifting. Alternatively, two speed thresholds may be used—one for turning off engine braking and one for permitting the upshift. The thresholds may vary for different gears (i.e., higher gears vs. lower gears).

After the higher gear is engaged at step 310, fuel is again supplied to all cylinders as required by engine operation and torque is ramped up. The cylinders that have had engine brakes applied may only have fuel resumed after a switching off time (i.e., a delay) of the braking devices has occurred.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for controlling upshifting of a vehicle having an automated manual transmission, comprising:
   reducing an amount of fuel being provided to a first grouping of cylinders, the first grouping of cylinders being fewer than all of the available cylinders;
   placing the first grouping of cylinders in an engine braking mode;
   disengaging a first gear of the vehicle transmission;
   reducing an amount of fuel being provided to a second grouping of cylinders which does not include the first grouping of cylinders;
   causing braking to reduce engine speed;

determining when to remove the first grouping of cylinders from the engine braking mode in response to a rate of engine speed reduction;
removing the first grouping of cylinders from the engine braking mode; and
engaging a second gear of the transmission.

2. The method of claim 1, wherein causing braking comprises activating a motor/generator of the vehicle to provide regenerative braking.

3. The method of claim 1, wherein the braking is compression braking.

4. The method of claim 1, further comprising: detecting a beginning of an upshift process.

5. The method of claim 4, wherein detecting a beginning of an upshift process comprises detecting at least one of a pedal position, an engine speed, and a torque characteristic.

6. The method of claim 1, wherein reducing the amount of fuel being provided to the first grouping of cylinders comprises providing fuel to the second grouping of cylinders and activating an electric motor to compensate for a loss of power resulting from the reduced amount of fuel provided to the first grouping of cylinders.

7. The method of claim 1, further comprising ramping up engine torque after engaging the second gear by supplying fuel to the first grouping of cylinders and the second grouping of cylinders.

8. A system for controlling upshifting of a vehicle having an automated manual transmission, comprising:
   an ECM;
   a first grouping of fuel injectors configured to provide fuel to a corresponding first grouping of cylinders, the first grouping of cylinders being less than all of the available cylinders;
   a second grouping of fuel injectors configured to provide fuel to a corresponding second grouping of cylinders which does not include the first grouping of cylinders; and
   a motor/generator;
   wherein the ECM is configured to
      cause the first grouping of fuel injectors to reduce an amount of fuel being provided to the first grouping of cylinders,
      place the first grouping of cylinders in an engine braking mode,
      disengage a first gear of the vehicle transmission,
      cause the second grouping of fuel injectors to reduce an amount of fuel being provided to the second grouping of cylinders,
      activate the motor/generator and reduce engine speed through braking,
      determine when to remove the first grouping of cylinders from the engine braking mode in response to a rate of engine speed reduction,
      remove the first grouping of cylinders from engine braking mode, and
      engage a second gear of the vehicle transmission.

9. The system of claim 8, wherein the braking is compression braking.

10. The system of claim 8, wherein the ECM is further configured to detect a beginning of an upshift process.

11. The system of claim 10, wherein the ECM is configured to detect a beginning of an upshift process by detecting at least one of a pedal position, an engine speed, and a torque characteristic.

12. The system of claim 8, wherein the ECM is configured to cause the first and second groupings of fuel injectors to ramp up engine torque after engaging the second gear by supplying fuel to the first grouping of cylinders and the second grouping of cylinders, respectively.

* * * * *